Aug. 23, 1966
W. A. TARWID
3,268,620
COATING FOR A METAL SURFACE CONTAINING POLYVINYL CHLORIDE
RESINS, EPOXIDIZED POLYBUTADIENE, UREA-FORMALDEHYDE
RESIN, AND A METHYLOL PHENOL ETHER
Filed July 11, 1962
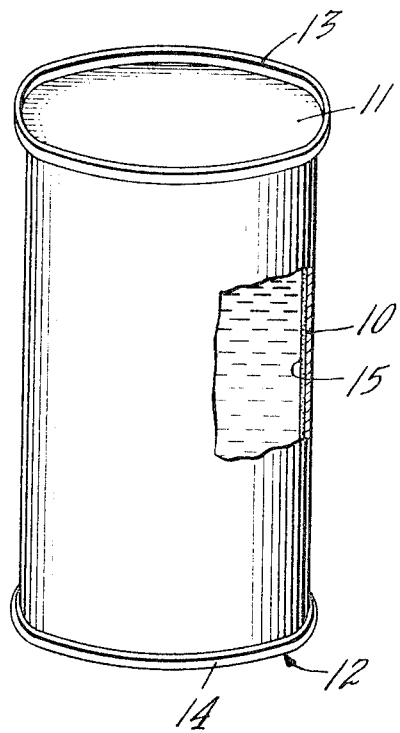
INVENTOR.
WESLEY ALBION TARWID
BY Robert P. Auber
George W. Reiber
ATTORNEYS 3,268,620
COATING FOR A METAL SURFACE CONTAINING POLYVINYL CHLORIDE RESINS, EPOXIDIZED POLYBUTADIENE, UREA - FORMALDEHYDE RESIN, AND A METHYLOL PHENOL ETHER
Wesley Albion Tarwid, Barrington, Ill., assignor to American Can Company, New York, N.Y., a corporation of New Jersey
Filed July 11, 1962, Ser. No. 209,112
14 Claims. (Cl. 260—834)

The present invention pertains to an organic composition particularly adapted for application directly to a metal surface. More specifically, it pertains to a particular organosol composition containing a high molecular weight polyvinyl chloride and an epoxidized polyolefin which after application and curing has outstanding properties including excellent adhesion to bare metal.

A number of metal cans produced today because of the sensitivity of the product packed therein require a particularly inert and continuous barrier between the metal of the can and the sensitive product. Examples of such cans are those for holding beer and carbonated soft drinks.

Polyvinyl chloride resins have been found best suited to provide the required inert, taste and odor-free barrier film. Unfortunately, polyvinyl chloride resins have exceptionally poor adhesion to bare metal. Therefore, the present practice is to apply a base coat to the bare metal and apply the desired polyvinyl chloride resins thereover. Obviously, such a practice increases the expense of the finished can both as to materials and its manufacture. Heretofore the search for a polyvinyl chloride resin which when solidified or cured is adherent directly to metal and provides an inert, continuous barrier or lining for the inside of metal cans has been unsuccessful.

It is therefore an object of the present invention to provide a coating composition containing a polyvinyl chloride resin which is excellently suited as the interior lining for a sheet metal can.

Another object is to provide an organosol coating composition containing a polyvinyl chloride resin which can be readily applied directly to metal by means of conventional coating techniques.

Still another object is to provide a metal can having a polyvinyl chloride resin composition adhered directly and firmly to all or any portion of its interior metal surface.

Still a further object is to provide an organosol coating composition which is capable of being adhered directly to a metal surface to provide an inert, flexible, continuous protective coating.

Numerous other objects and advantages of the invention will be apparent as it is better understood from the following description, which, taken in connection with the accompanying drawing, discloses a preferred embodiment thereof.

Referring to the drawing:

The figure is a perspective view of a can partly in section.

The above objects are accomplished by forming a coating composition containing as its essential resinous ingredients a high molecular weight polyvinyl chloride, an epoxidized polybutadiene, an urea-formaldehyde condensation product, a vinyl chloride-vinyl acetate interpolymer and a methylol phenol ether. This composition dispersed and dissolved in a fugitive organic liquid is applied directly to the surface of a metal such as tin plate, black plate or aluminum by any conventional coating procedure, such as roller coating, and thereafter baked at an elevated temperature to fuse the resin and remove the volatile liquids therefrom and thereby provide the metal with a highly adherent, flexible, inert, mar-resistant protective coating. If the metal to which the instant composition is applied is in the form of flat, sheet metal, i.e. individual sheets or continuous strip, this sheet metal may thereafter be readily formed into cans or can parts by any of the usual can-making procedures with the subject coating on its interior surface. This ready formation into cans or can parts such as ends is possible by virtue of the high flexibility, adhesion and mar-resistance of the coating.

Since the coating composition of the subject invention is an organosol, the polyvinyl chloride resin used therein must have a relatively high molecular weight as measured by the Staudinger method described in Ind. Eng. Chem., vol. 36, page 1152 (1936), and must be relatively insoluble in the usual solvents for lower molecular weight vinyl chloride resins. Suitable for use in the instant invention are polyvinyl chloride resins having a molecular weight of at least 15,000 and preferably above 20,000. Because they are designed for dispersion in the liquid ingredients of the organosol, these high molecular weight polyvinyl chloride resins should be in a finely divided state, generally in a particle size of less than 5 microns and preferably of a size of .01 to 1 micron. By polyvinyl chloride resin, as used herein, is meant not only resins composed of 100% of polymerized vinyl chloride but also copolymers of vinyl chloride and other ethylenically unsaturated monomers such as vinyl acetate. However, these copolymers must contain at least 90% of combined vinyl chloride.

The epoxidized polybutadiene component of the organosol composition is formed by oxidizing, in solution, polybutadiene having an absolute viscosity of about 1500 cps. at 100° F. with a peracid. The absolute viscosity at a given temperature of a polybutadiene is a conventional method of designating the degree of polymerization or average molecular weight of the polymer. For the purpose of the instant invention 1500 cps. at 100° F. describes the preferred polybutadiene. However, it is to be understood that polybutadienes having a somewhat higher or lower molecular weight as evidenced by a somewhat higher or lower absolute viscosity respectively may also be used.

The epoxide group is introduced into the polybutadiene chain by means of organic peracids, usually aliphatic peracids such as peracetic acid or performic acid. This reaction usually takes place in a solvent for the polybutadiene and peracid such as toluene and at elevated temperatures, e.g. about 60° C., and in the presence of a suitable catalyst such as sulphuric acid. The amount of epoxidization of the polybutadiene or quantity of oxirane oxygen introduced into the polybutadiene chain will depend upon the percentage of the stoichiometric quantity of epoxidizing peracid reacted with polybutadiene. For use in the instant invention the epoxidized polybutadiene contains from about 4 to 8% and preferably about 6% oxirane oxygen, i.e. 4 to 8 and preferably 6 gram-mols of oxirane oxygen per 100 gram-mols of epoxidized resin. To obtain about 6% of oxirane oxygen, an amount of peracids in the order of magnitude of 50% of the stoichiometric amount is reacted with the polybutadiene.

The following is an idealized structural formula of the preferred epoxidized polybutadiene from peracetic acid and butadiene-1,4 having utility in the instant organosol.

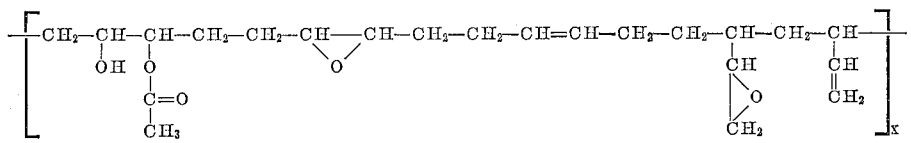

wherein X is a number whole or fractional between 2 and 5. Although not shown in this idealized structural formula, the greatest percentage of molecules of the epoxidized polybutadiene useful in the instant invention have terminal oxirane groups.

The epoxidized polybutadiene performs several functions in the instant organosol. This epoxidized polyolefin resin of itself has film-forming properties and complements the polyvinyl chloride resin in the formation of the final, tightly-knit, protective coating film. In its role as an adjunct film-former, this epoxy resin also acts as a non-migratory plasticizer, for the vinyl chloride resin. Because it is polymeric, it is non-fugitive at least at the temperatures to which it is subjected during baking, thereby obviating any fuming or obnoxious smoking during baking. In addition to its film-forming and plasticizer functions, the epoxidized polyolefin resin markedly aides in promoting the adhesion of the polyvinyl chloride resin to a bare metal surface.

The urea-formaldehyde resin present in the organosol composition is a B-stage condensation product of urea and formaldehyde. Since this resin is in its soluble and fusible state, it is capable of further reaction. While not wishing to be bound by any particular theory, it is believed that the urea-formaldehyde resin, upon baking of the organosol after its application to a metal surface, reacts at least in part with the epoxidized polybutadiene to improve the tightness and inertness of the resulting coating.

The vinyl chloride-vinyl acetate interpolymer is a well known interpolymer of vinyl chloride-vinyl acetate and either maleic acid or maleic anhydride. Preferred for use in the instant organosol is the product sold commercially under the trade name VMCC. This interpolymer contains by weight about 86% combined vinyl chloride, 13% combined vinyl acetate and 1% maleic acid. As with the urea-formaldehyde, this vinyl interpolymer is believed to react with the epoxide groups of the epoxidized polybutadiene to improve the tightness and inertness of the final film. Additionally, this interpolymer by virtue of its strongly polar carboxyl groups aides in adhering the final dry film to the bare metal surface.

The methylol phenol ethers useful in the instant invention are those in which the hydroxyl hydrogen of the phenol is substituted by an alkyl or cyclo alkyl group, either saturated or unsaturated, or by an aralkyl group, as well as halogenated derivatives of the alkyl, cycloaliphatic and aralkyl groups. A typical example of such a compound has the general formula

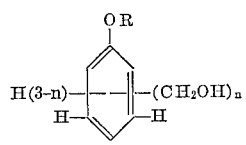

where R represents a number of the class consisting of alkyl, cycloaliphatic and aralkyl groups and halogenated derivatives thereof and n represents an integer of from 1 to 3. Mixtures of the methylol phenyl ethers can also be employed in my compositions. A specific compound that is preferred is one in which R represents an allyl group and n represents the integer 3, such as

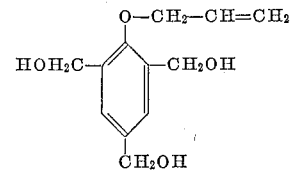

This material may contain small amounts of monomethylol and dimethylol phenyl allyl ether.

The methylol phenol ether, upon polymerization, aids in adhering the dry coating to the metal surface. To facilitate this polymerization, the organosol contains a small amount of an acid catalyst, preferably phosphoric acid.

The following table sets forth the relative proportions of the ingredients heretofore described for use in the subject invention. These proportions are given in parts by weight.

| Ingredient | Broad Range, Percent | Preferred, Percent |
|---|---|---|
| High mol. wt. polyvinyl chloride | 50–70 | 57 |
| Epoxidized polybutadiene | 15–40 | 30 |
| Urea-formaldehyde | 2–10 | 5.5 |
| Vinyl interpolymer | 2–10 | 3.6 |
| Methylol phenol ether | 2–10 | 3.6 |
| Acid polymerization catalyst | 0.1–1.0 | 0.3 |

A variety of fugitive organic solvents can be used as the liquid vehicle for the non-volatile resins depending upon the desired properties of the liquid coatings, e.g. viscosity, flow-out, drying time, etc. For economic reasons it is preferred to use as high a percentage of relatively inexpensive aromatic solvents as possible, such as benzene, toluene and xylene. However, since the vinyl interpolymer is insoluble in such solvents at least a portion of the liquid vehicle must be composed of oxygen-containing polar solvents such as ketones, e.g. methyl ethyl ketone and isophorone; ether alcohols, e.g. 2-butoxy ethanol; and glycol ethers, e.g. diethylene glycol mono-butyl ether.

As mentioned previously, the organosol can be applied by any suitable means, most usually roller coating or spraying. In such an operation it is desirable that the liquid coating composition contain as high a solids content as possible so as to permit the application of a sufficiently thick film in a minimum of operations. For the purpose of the instant invention, the liquid organosol contains from 40 to 60 and preferably 53 parts by weight of non-volatile solids, the remainder being the fugitive organic solvent. This corresponds to an absolute viscosity at 75° F. of from 100 to 500 and preferably 225 cps.

*Example 1*

| Ingredient: | Parts by weight |
|---|---|
| (1) High mol. wt. polyvinyl chloride | 29.47 |
| (2) Preferred epoxidized polybutadiene | 15.7 |
| (3) B-stage urea-formaldehyde resin | 2.95 |
| (4) Preferred vinyl interpolymer (VMCC) | 1.95 |
| (5) Preferred methylol phenol ether | 1.95 |
| (6) 25% $H_3PO_4$ in butanol | 0.63 |
| (7) SC–150 (aromatic solvent) | 37.0 |
| (8) Isophorone | 7.89 |
| (9) Butyl carbitol | 2.46 |

Ingredients (2) through (6) were added with stirring to the blend of solvents (7), (8) and (9). This mixture was then added to a pebble mill half filled with porcelain balls and containing (1). The liquid level of the charge just covered the grinding media. The charge was ground for 24 hours. The product had about 50.7% solids and a viscosity of about 225 cps. at 75° F. The fineness of grind on the product was about 6½ NS on a Hegman grind gauge.

*Example 2*

The organosol prepared as in Example 1 was applied by direct roller coater on flat panels of tin plated steel. A dry coating weight of 8¾ mg. per sq. in. was obtained after maintaining a plate temperature of 405° F. for 8 minutes in a forced air gas fired oven. The baked film was clear, tough, flexible and had good adhesion to the plate. The film also had good physical and chemical resistance. Can ends fabricated from the coated plate were double seamed onto metal bodies to make complete containers without damage to the film. When such containers are filled with beer and processed for 20 minutes at 140° F. the film essentially remains unchanged and has excellent adhesion.

The above single coat organosol is readily applied by roller coating in the range of from 5 to 25 mg. per sq. in. and preferably about 8.75 mg. per sq. in. The baking range of the coating can vary from 15 minutes at 380° F. to 5 minutes at 425° F. with 8 minutes at 405° F. being preferred.

As the preferred or exemplary embodiment of the instant invention, the drawing shows a tubular tin plate can body 10. As mentioned previously, the can body 10 may be composed of other materials such as black plate or aluminum. The upper and lower ends 11 and 12 respectively are integral with the body 10. These ends may be joined to the can body in any suitable manner such as by conventional double seams 13, 14; or one end may be of one-piece with the body such as occurs in the formation of drawn or impact extruded aluminum cans.

Firmly adhered to the inside surface of the body 10 is a substantially water-white, solid, protective coating 15. Although not specifically illustrated in the drawing, the coating 15 may be adhered to the inner surface of the can ends 11, 12 rather than to the body 10; or the coating 15 may be adhered to the inner surface of both the body and ends. The coating 15 is composed of the resinous ingredients heretofore described in Example 1 and applied directly to the metal of the body 10 and/or ends 11, 12 in the manner set forth in Example 2.

It is thought that the invention and many of its attendant advantages will be understood from the foregoing description and it will be apparent that various changes may be made in the matter of ingredients, the identity and the proportions of the formulation, and that changes may be made in the form, construction and arrangement of the parts of the article without departing from the spirit and scope of the invention or sacrificing all of its material advantages, the form hereinbefore described being merely a preferred embodiment thereof.

I claim:

1. A coating composition for application directly to a metal surface comprising a high molecular weight polyvinyl chloride resin, an epoxidized polybutadiene resin, a urea-formaldehyde resin, an interpolymer of vinyl chloride, vinyl acetate and a member of the group consisting of maleic acid and maleic anhydride, a methylol phenol ether, and an acid catalyst for said ether.

2. The coating composition set forth in claim 1 wherein said polyvinyl chloride has an average molecular weight in excess of 15,000.

3. The coating composition set forth in claim 1 wherein said polyvinyl chloride is in the form of fine particles having a size of less than 5 microns.

4. The coating composition set forth in claim 1 wherein said epoxidized polybutadiene contains by weight from 4 to 8% oxirane oxygen.

5. The coating composition set forth in claim 1 wherein said ether is 1-allyloxy 2,4,6-trimethylol benzene.

6. The coating composition of claim 5 wherein said acid catalyst is ortho phosphoric acid.

7. The coating composition set forth in claim 1 containing a fugitive organic liquid in which said polyvinyl chloride is dispersed, and said epoxidized polybutadiene, said urea-formaldehyde resin, said interpolymer, said ether and said catalyst are dissolved.

8. The coating composition set forth in claim 7 wherein said non-volatile solids comprise 40 to 60 parts by weight of said composition.

9. The coating composition set forth in claim 8 having an absolute viscosity at 75° F. of 100 to 500 cps.

10. The coating composition set forth in claim 1 containing, by weight based on said non-volatile solids, 50 to 70 parts of said polyvinyl chloride, 15 to 40 parts of said epoxidized polybutadiene, 2 to 10 parts of said urea-formaldehyde, 2 to 10 parts of said interpolymer, 2 to 10 parts of said ether, and 0.1 to 1 part of said acid catalyst.

11. An article having adhered directly to a metal surface thereof a tightly-knit, inert film of the baked coating composition set forth in claim 1.

12. A metal can having adhered to a surface thereof a tightly-knit, inert film of the baked coating composition set forth in claim 1.

13. The metal can set forth in claim 12 wherein said film is adhered to an interior surface of said can.

14. A metal can having a tubular body and ends integral therewith, and the baked coating composition set forth in claim 1 adhered to the inside surface of at least one of said ends.

References Cited by the Examiner

UNITED STATES PATENTS

| | | | |
|---|---|---|---|
| 2,893,968 | 7/1959 | Greenlee | 260—21 |
| 2,947,442 | 8/1960 | Roeser | 220—64 |
| 3,105,826 | 10/1963 | Jaggard | 260—834 |
| 3,110,413 | 11/1963 | McKay et al. | 220—64 |
| 3,137,666 | 6/1964 | Lox et al. | 260—834 |
| 3,170,963 | 2/1965 | Ravve et al. | 260—834 |

SAMUEL H. BLECH, *Primary Examiner.*

DONALD E. CZAJA, *Examiner.*

K. LOCKO, P. LIEBERMAN, *Assistant Examiners.*